United States Patent
Wu

(10) Patent No.: US 10,015,833 B2
(45) Date of Patent: *Jul. 3, 2018

(54) DEVICE OF RADIO NETWORK TEMPORARY IDENTIFIER ALLOCATION IN DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,718

(22) Filed: Aug. 16, 2016

(65) Prior Publication Data

US 2016/0360567 A1    Dec. 8, 2016

Related U.S. Application Data

(63) Continuation of application No. 14/455,952, filed on Aug. 11, 2014, now Pat. No. 9,456,461.
(Continued)

(51) Int. Cl.
*H04W 76/02* (2009.01)
*H04W 74/00* (2009.01)
(Continued)

(52) U.S. Cl.
CPC .......... *H04W 76/025* (2013.01); *H04W 8/26* (2013.01); *H04W 74/004* (2013.01);
(Continued)

(58) Field of Classification Search
CPC .......... H04W 76/021; H04W 74/0833; H04W 76/025; H04W 76/04
See application file for complete search history.

(56) References Cited

U.S. PATENT DOCUMENTS 8,295,165 B2 * 10/2012 Jung .................. H04W 76/028
370/225
8,948,768 B2     2/2015 Bienas
(Continued)

FOREIGN PATENT DOCUMENTS

CN        102595639 A    7/2012
EP         2448325 A1    5/2012
(Continued)

OTHER PUBLICATIONS

Broadcom Corporation, Mobility for dual connectivity, 3GPP TSG RAN WG2 Meeting#81bis, Chicago, USA, Apr. 15-19, 2013, R2-130990.
(Continued)

*Primary Examiner* — Mohammad Adhami
*Assistant Examiner* — Shailendra Kumar
(74) *Attorney, Agent, or Firm* — Winston Hsu

(57) ABSTRACT

A communication device for RNTI allocation comprises a processing means, for executing a program, and a storage unit, coupled to the processing means, for storing the program which instructs the processing means to perform the steps: connecting to a first base station, receiving a first RNTI assigned by the first base station, receiving a RRC message including a second RNTI for communication with a second base station from the first base station, transmitting a RRC message response to the first base station, performing communication with the first base station with the first RNTI and communication with the second base station with the second RNTI, transmitting a random access preamble to the second base station, receiving a random access response from the second base station, transmitting a scheduled transmission containing the second RNTI to the second base station, and receiving a contention resolution message from the second base station.

18 Claims, 12 Drawing Sheets

Related U.S. Application Data

(60) Provisional application No. 61/863,914, filed on Aug. 9, 2013.

(51) Int. Cl.
  *H04W 76/06* (2009.01)
  *H04W 74/08* (2009.01)
  *H04W 8/26* (2009.01)
  *H04W 84/04* (2009.01)

(52) U.S. Cl.
  CPC ..... *H04W 74/006* (2013.01); *H04W 74/0833* (2013.01); *H04W 76/021* (2013.01); *H04W 76/064* (2013.01); *H04W 76/068* (2013.01); *H04W 84/045* (2013.01)

(56) References Cited

U.S. PATENT DOCUMENTS

| | | |
|---|---|---|
| 2004/0213279 A1 | 10/2004 | Kusaki |
| 2006/0233376 A1 | 10/2006 | Forsberg |
| 2008/0188200 A1 | 8/2008 | Forsberg |
| 2010/0054472 A1 | 3/2010 | Barany |
| 2010/0191971 A1 | 7/2010 | Bajic |
| 2010/0329211 A1 | 12/2010 | Ou |
| 2011/0122843 A1 | 5/2011 | Iwamura |
| 2012/0082084 A1 | 4/2012 | Balakrishnan |
| 2012/0106510 A1 | 5/2012 | Kuo |
| 2012/0142354 A1 | 6/2012 | Ahluwalia |
| 2012/0149419 A1 | 6/2012 | Roh |
| 2012/0236707 A1 | 9/2012 | Larsson |
| 2012/0281548 A1* | 11/2012 | Lin ........................ H04W 36/30 370/242 |
| 2013/0039339 A1 | 2/2013 | Rayavarapu |
| 2013/0053048 A1 | 2/2013 | Garcia |
| 2013/0244678 A1 | 9/2013 | Damnjanovic |
| 2013/0316712 A1 | 11/2013 | Lee |
| 2014/0092866 A1 | 4/2014 | Teyeb |
| 2014/0241317 A1 | 8/2014 | Jamadagni |
| 2014/0286243 A1* | 9/2014 | Yamada .............. H04W 76/025 370/329 |
| 2014/0307872 A1 | 10/2014 | Heo |
| 2014/0308921 A1 | 10/2014 | Zhang |
| 2014/0337935 A1 | 11/2014 | Liu |
| 2015/0043490 A1 | 2/2015 | Wu |
| 2015/0043492 A1 | 2/2015 | Baek |
| 2016/0037405 A1 | 2/2016 | Choi |

FOREIGN PATENT DOCUMENTS

| | | |
|---|---|---|
| EP | 2963966 A1 | 1/2016 |
| JP | 20143440 A | 1/2014 |
| JP | 2014158240 A | 8/2014 |
| JP | 2014527764 A | 10/2014 |
| TW | I337030 | 2/2011 |
| TW | I351234 | 10/2011 |
| TW | I357270 | 1/2012 |
| WO | 2011100492 A1 | 8/2011 |
| WO | 2012092736 A1 | 7/2012 |
| WO | 2012168996 A1 | 12/2012 |
| WO | 2013024333 A2 | 2/2013 |
| WO | 2013024333 A3 | 2/2013 |
| WO | 2013116976 A1 | 8/2013 |
| WO | 2014109606 A1 | 7/2014 |
| WO | 2014147929 A1 | 9/2014 |

OTHER PUBLICATIONS

European patent application No. 14180472.4, European Search Report dated Oct. 8, 2014.
3GPP TR 36.842 V12.0.0 (Dec. 2013), "3rd Generation Partnership Project; Technical Specification Group Radio Access Network; Study on Small Cell enhancements for E-UTRA and E-UTRAN; Higher layer aspects (Release 12)", XP050752647, pp. 1-71.
3GPP TS 36.300 V11.6.0 (Jun. 2013), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", XP050712084, pp. 1-209.
3GPP TS 36.331 V11.2.0 (Dec. 2012), "3rd Generation Partnership Project; Technical Specification Group Radio Access Network; Evolved Universal Terrestrial Radio Access (E-UTRA); Radio Resource Control (RRC); Protocol specification (Release 11)", XP050691590, pp. 1-340.
Huawei, Hisilicon, "Analysis of inter-node signalling load for mobility mechanism in small cell deployment", 3GPP TSG-RAN WG2 Meeting#81bis, R2-131260, Apr. 15-19, 2013, Chicago, USA, XP050699466, pp. 1-4.
Huawei, HiSilicon, "Study of Solutions and Radio Protocol Architecture for Dual-Connectivity", 3GPP TSG-RAN WG2 Meeting#81bis, R2-131164, Apr. 15-19, 2013, Chicago, USA, XP050699432, pp. 1-12.
Intel Corporation, "Radio link failure handling for dual connectivity", 3GPP TSG RAN WG2 Meeting#82, R2-131990, May 20-25, 2013, Fukuoka, Japan, XP050700115, pp. 1-4.
Pantech, "Analysis of the RLF in dual connectivity", 3GPP TSG-RAN WG2 Meeting#81bis, R2-131100, Apr. 15-19, 2013, Chicago, USA, XP050699421, pp. 1-5.
3GPP TR 36.932 V12.0.0(Dec. 2012), "3rd Generation Partnership Project; Technical Specification Group Radio Access Network; Scenarios and Requirements for Small Cell Enhancements for E-UTRA and E-UTRAN (Release 12)", pp. 1-14.
Catt, "Evaluation on the mobility enhancement", 3GPP TSG RAN WG2 Meeting#81, R2-130116, Jan. 28-Feb. 1, 2013, St. Julian's, Malta, XP050668013, pp. 1-3.
3GPP TS 36.321 V11.3.0(Jun. 2013), "3rd Generation Partnership Project; Technical Specification Group Radio Access Network; Evolved Universal Terrestrial Radio Access (E-UTRA); Medium Access Control (MAC) protocol specification (Release 11)", pp. 1-57.
3GPP TS 36.331 V11.4.0(Jun. 2013), 3rd Generation Partnership Project; Technical Specification Group Radio Access Network; Evolved Universal Terrestrial Radio Access (E-UTRA); Radio Resource Control (RRC); Protocol specification (Release 11), pp. 1-346.
Ericsson, ST-Ericsson, "Protocol architecture alternatives for dual connectivity", 3GPP TSG-RAN WG2 #81, Tdoc R2-130420, Jan. 28-Feb. 1, 2013, Malta, pp. 1-10.
NTT Docomo, Inc., "Discussion on U-plane architecture for dual connectivity", 3GPP TSG-RAN WG2 #81, Tdoc R2-130324, Jan. 28-Feb. 1, 2013, St. Julian's, Malta, pp. 1-6.
Office Action dated Feb. 3, 2015 for the Japanese Application No. 2014-033382, filing date Feb. 24, 2014, pp. 1-3.
European Search report dated Jul. 2, 2014 for EP application No. 14020057.7, filing date May 2, 2014.
Office action dated Jul. 11, 2014 for the European application No. 14020057.7, filing date May 2, 2014, p. 1-9.
Notice of Allowance dated Feb. 4, 2016 for the U.S. Appl. No. 14/187,325, filed Feb. 24, 2014, pp. 1-14.
European Search report dated Jan. 29, 2016 for EP application No. 15186869.2.
3GPP TS 36.300 V11.4.0 (Dec. 2012), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", XP050691592, pp. 1-208.
3GPP TS 36.423 V11.3.0 (Dec. 2012), "3rd Generation Partnership Project; Technical Specification Group Radio Access Network; Evolved Universal Terrestrial Radio Access Newtork (E-UTRAN); X2 application protocol (X2AP) (Release 11)", XP050691148, pp. 1-141.
Samsung, "Discussion on inter-ENB Carrier Aggregation", 3GPP TS-RAN WG2 Meeting #81bis, R2-131069, Apr. 15 to 19, 2013, Chicago, US, XP050699237, pp. 1-5.
European Search report dated Jan. 26, 2015 for EP application No. 14180472.4, filing date Aug. 11, 2014.

(56) References Cited

OTHER PUBLICATIONS

3GPP TR 37.803 V11.2.0 (Jun. 2013), "3rd Generation Partnership Project; Technical Specification Group Radio Access Network; Universal Mobile Telecommunications System (UMTS) and LTE; Mobility enhancements for Home Node B (HNB) and Home enhanced Node B (HeNB) (Release 11)", XP050711892, pp. 1-116.
3GPP TS 36.321 V11.3.0 (Jun. 2013), "3rd Generation Partnership Project; Technical Specification Group Radio Access Network; Evolved Universal Terrestrial Radio Access (E-UTRA); Medium Access Control (MAC) protocol specification (Release 11)", XP050712004, pp. 1-57.
Sharp, "PCell vs. SCell with PUCCH for inter-eNB CA", 3GPP TSG-RAN WG2#82, R2-132052, May 20-24, 2013, Fukuoka, Japan, XP050700141, pp. 1-6.
European Search report dated Oct. 8, 2014 for EP application No. 14020017.1, filing date Feb. 24, 2014.
Office action dated Oct. 17, 2014 for the European application No. 14020017.1, filing date Feb. 24, 2014, pp. 1-20.
3GPP TS 33.401 V12.6.0 (Dec. 2012), "3rd Generation Partnership Project; Technical Specification Group Services and System Aspects; 3GPP System Architecture Evolution (SAE); Security architecture (Release 12)", XP050691417, pp. 1-121.
NTT Docomo, Inc., "Necessity of C-plane architecture enhancements for dual connectivity", 3GPP TSG-RAN2#81, R2-130488, Jan. 28-Feb. 1, 2013, St. Julian's, Malta, XP050668107, pp. 1-4.
Samsung, "Preliminary discussion on inter-ENB Carrier Aggregation", 3GPP TSG-RAN WG2 Meeting#81, R2-130099, Jan. 28-Feb. 1, 2013, St. Julian's, Malta, XP050668002, pp. 1-5.
Office action dated Jun. 2, 2015 for the U.S. Appl. No. 14/267,917, filed May 2, 2014, pp. 1-27.
Office action dated Aug. 13, 2015 for the U.S. Appl. No. 14/187,325, filed Feb. 24, 2014, pp. 1-33.
ETSI TS 136 300 V11.4.0 (Feb. 2013), LTE; Evolved Universal Terrestrial Radio Access (E-Utra) and Evolved Universal Terrestrial Radio Access Network (E-UTRAN); Overall description; stage2; (3GPP TS 36.300 version 11.4.0 Release 11).
ETSI TS 136 331 V11.1.0 (Nov. 2012), LTE; Evolved Universal Terrestrial Radio Access (E-UTRA); Radio Resource Control (RRC); Protocol specification; (3GPP TS 36.331 version 11.1.0 Release 11).
Office action dated Sep. 10, 2015 for the European application No. 14180472.4, pp. 1-7.
Office action dated Dec. 10, 2015 for the Taiwan application No. 103127521, filing date Aug. 11, 2014, pp. 1-8.
Huawei, HiSilicon, "Analysis of inter-node signalling load for mobility mechanism in small cell deployment", 3GPP TSG-RAN WG2 Meeting #81, R2-130228, Jan. 28-Feb. 1, 2013, St. Julian's, Malta, XP050668295, pp. 1-5.
Huawei, HiSilicon, "Feasible scenarios and benefits of dual connectivity in small cell deployment", 3GPP TSG-RAN WG2 Meeting #81, R2-130225, Jan. 28-Feb. 1, 2013, St. Julian's, Malta, XP050668294, pp. 1-9.
Notice of Allowance dated May 10, 2016 for the U.S. Appl. No. 14/267,937, filed May 2, 2014, pp. 1-27.
Office Action dated Nov. 1, 2016 for the Japanese Application No. 2015-231092, filing date: Nov. 26, 2015, pp. 1-3.
Office action dated Feb. 2, 2017 for the U.S. Appl. No. 15/135,564, filed Apr. 22, 2016, pp. 1-24.
Office action dated May 2, 2017 for the China application No.201410404801.4, filing date Aug. 11, 2014, pp. 1-11.
Search Report dated Feb. 24, 2017 for EP application No. 16201831.1, pp. 1-6.
3GPP TS 36.300 V11.6.0(Jun. 2013), "3rd Generation Partnership Project; Technical Specification Group Radio Access Network; Evolved Universal Terrestrial Radio Access (E-UTRA) and Evolved Universal Terrestrial Radio Access Network(E-UTRAN); Overall description; Stage 2(Release 11)", XP050712084, pp. 1-209.
Pantech, "Analysis of the RLF in dual connectivity", 3GPP TSG-RAN WG2 Meeting #81bis, R2-131100, Apr. 15-Apr. 19, 2013, Chicago, USA, XP050699421, pp. 1-5.
Intel Corporation, "Radio link failure handling for dual connectivity", 3GPP TSG RAN WG2 Meeting #82, R2-131990, May 20-25, 2013, Fukuoka, Japan, XP050700115, pp. 1-4.
Office action dated Mar. 15, 2017 for EP application No. 16201831.1, pp. 1-6.
Huawei, HiSilicon, "Study of Solutions and Radio Protocol Architecture for Dual-Connectivity", 3GPP TSG-RAN WG2 Meeting #81 bis, R2-131164, Apr. 15-19, 2013, Chicago, USA, XP050699432, pp. 1-12.
Huawei, HiSilicon, "Analysis of inter-node signalling load for mobility mechanism in small cell deployment", 3GPP TSG-RAN WG2 Meeting #81 bis, R2-131260, Apr. 15-19, 2013, Chicago, USA, XP050699466, pp. 1-4.
Search Report dated May 16, 2017 for EP application No. 17158263.8, pp. 1-8.
Notice of allowance dated Jun. 20, 2017 for the Japanese Application No. 2015-231092, filing date Nov. 26, 2015, pp. 1-3.

\* cited by examiner

DEVICE OF RADIO NETWORK TEMPORARY IDENTIFIER ALLOCATION IN DUAL CONNECTIVITY

CROSS REFERENCE TO RELATED APPLICATIONS

This application is a continuation of U.S. application Ser. No. 14/455,952 filed on Aug. 11, 2014, which claims the benefit of U.S. Provisional Application No. 61/863,914, filed on Aug. 9, 2013.

BACKGROUND OF THE INVENTION

1. Field of the Invention

The present invention relates to a device in a wireless communication system, and more particularly, to a device of radio network temporary identifier allocation in a wireless communication system.

2. Description of the Prior Art

3GPP in Release 12 proposes dual connectivity for increasing user's throughput. Dual connectivity to at least two cells may be served by different evolved NodeBs (eNB), linked with non-ideal backhaul, e.g., there may be an eNB in charge of a cluster of cells. Therefore, a user equipment (UE) may be served by multiple eNBs when it is in dual connectivity mode.

The applicant notice a problem associated to C-RNTI allocation in dual connectivity. In carrier aggregation, the C-RNTI allocation is done by a PCell and a UE is configured a C-RNTI for uplink grant or downlink assignment. In an example, the UE is connected to an eNB1 with a C-RNTI. The eNB1 may configure the UE to connect to an eNB2 to enable dual connectivity. However, the C-RNTI in the eNB2 has been assigned to another UE for data transmission and reception. When the eNB2 schedules data transmission on PDCCH with the C-RNTI, the UE and the other UE transmits data using same frequency resources in a same subframe since both UEs thinks they are scheduled by the eNB2 for uplink data transmission. Both data transmissions may fail because the eNB2 cannot receive them due to C-RNTI collision. Even the eNB2 can receive the data transmission from the UE, the eNB2 may think the data transmission is from the other UE and deciphers the data with the other UE's key but the eNB2 cannot receive the data correctly due to using a wrong key to decipher. A similar problem also occurs in downlink communication. The UE may receive the other UE's data transmitted by the eNB2 because a same C-RNTI used in the UE and the other UE.

SUMMARY OF THE INVENTION

It is there for an objective to provide a device of radio network temporary identifier allocation in dual connectivity in a wireless communication system to solve the above problem.

The present invention discloses a communication device in a wireless communication system for radio network temporary identifier (RNTI) allocation in dual connectivity is disclosed. The communication device comprises a processing means, for executing a program, and a storage unit, coupled to the processing means, for storing the program which instructs the processing means to perform the following steps: connecting to a first base station of the wireless communication system, receiving a first RNTI assigned by the first base station for communication with the first base station, receiving a radio resource control (RRC) message including a second RNTI for configuring communication with a second base station of the wireless communication from the first base station, wherein the second RNTI is assigned by the second base station, transmitting a RRC message response to the first base station in response to the RRC message, performing communication with the first base station with the first RNTI and performing communication with the second base station with the second RNTI, in dual connectivity, transmitting a random access preamble in a random access channel (RACH) resource location to the second base station, wherein the random access preamble is selected by the communication device from a set of preambles broadcasted by the second base station in system information or configured in the RRC message, and the RACH resource location is configured in the RRC message or broadcasted by the second base station in the system information, receiving a random access response from the second base station in response to the random access preamble, wherein the random access response contains a random access preamble identifier corresponding to the random access preamble, a timing advance command and an uplink grant, applying the timing advance command for uplink time alignment with the second base station, transmitting a scheduled transmission containing the second RNTI to the second base station according to the uplink grant, and receiving a contention resolution message containing the second RNTI from the second base station.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
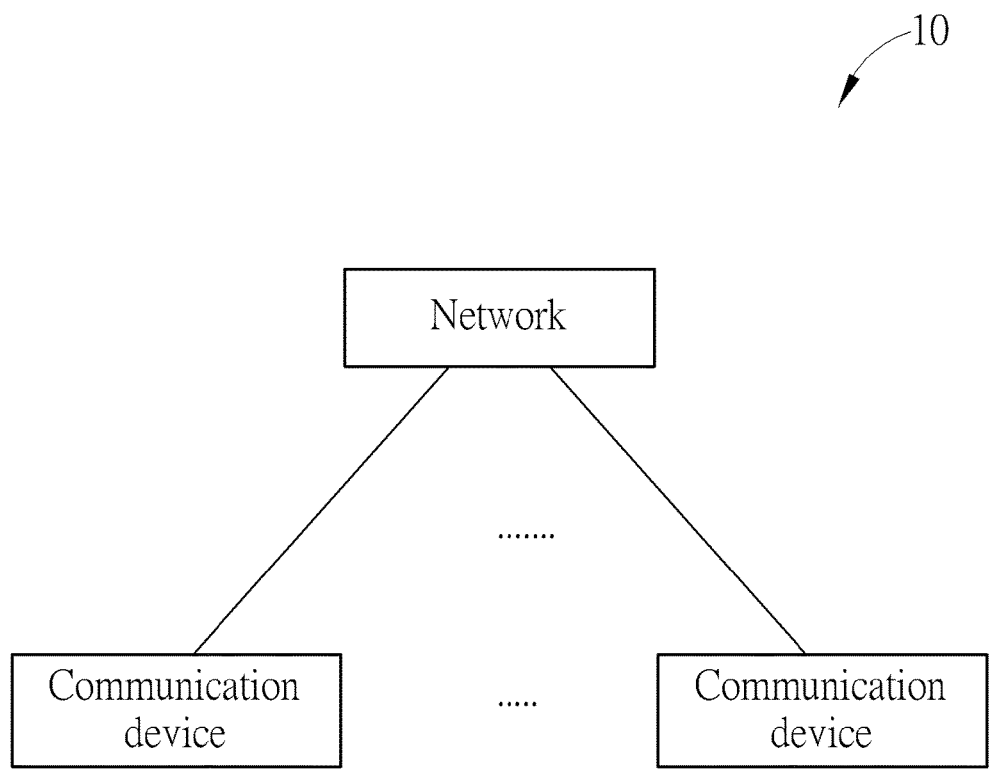
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system. The communication device can be a user equipment (UE).

Figure 2:
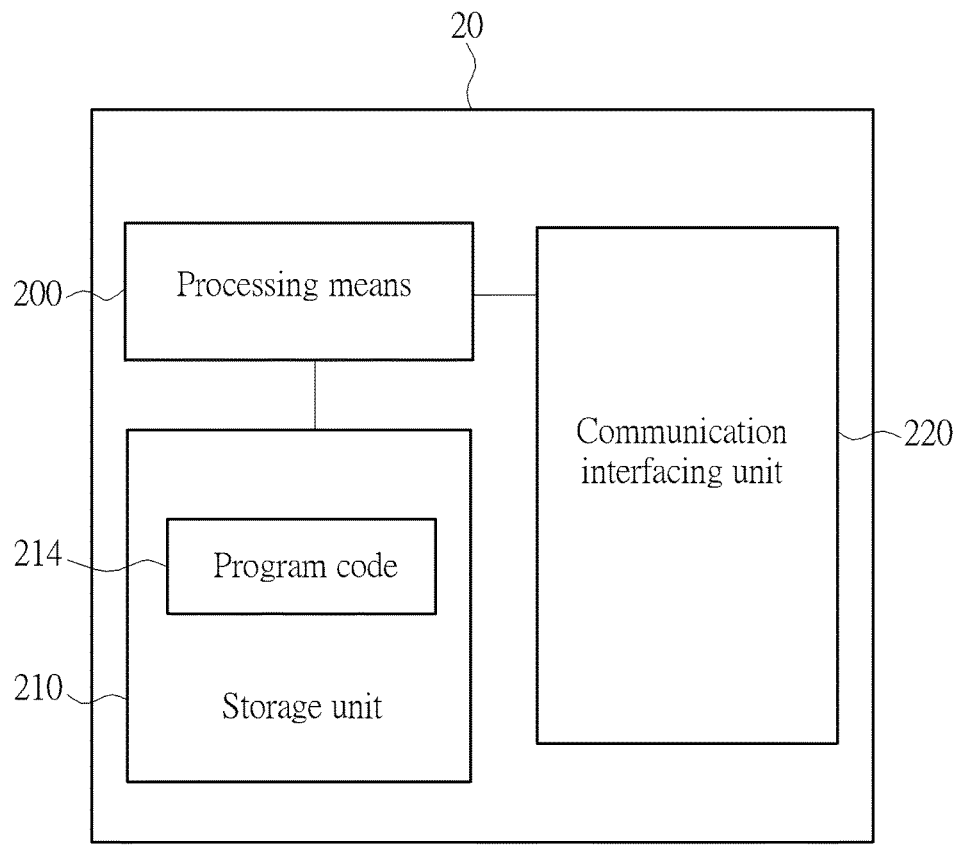
FIG. 2 is a schematic diagram of a communication apparatus according to an example of the present invention.

Please refer to FIG. 2, which is a schematic diagram of a communication apparatus 20 according to an example of the present invention. The communication apparatus 20 can be a communication device or the network shown in FIG. 1, but is not limited herein. The communication apparatus 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
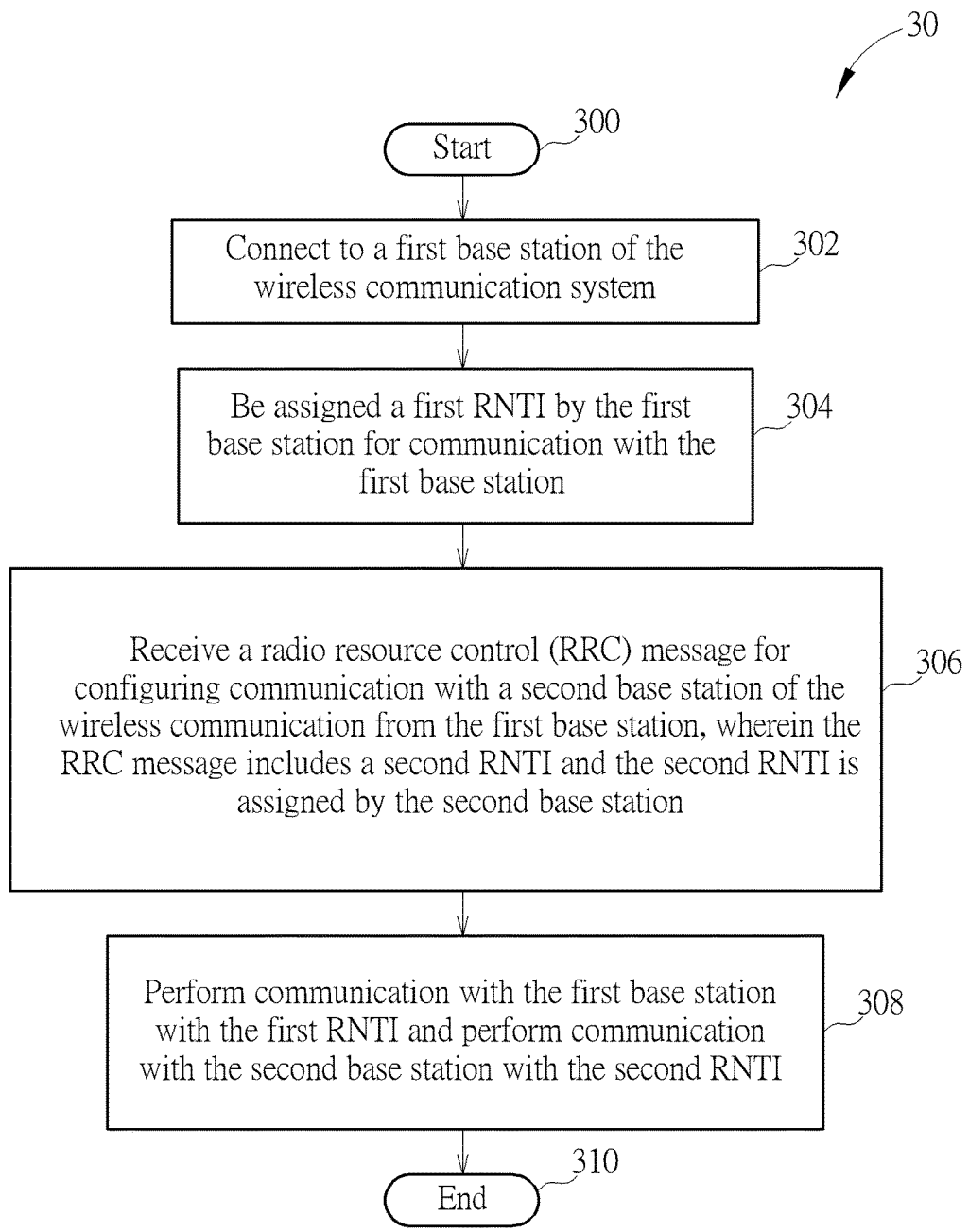
FIG. 3 is a flowchart of a process according to an example of the present invention.

Please refer to FIG. 3, which is a flowchart of a process 30 according to an example of the present invention. The process 30 is utilized in the communication device shown in FIG. 1, for RTNI allocation in dual connectivity in the wireless communication system 10. The process 30 may be compiled into the program code 314. The process 30 includes the following steps:

Step 300: Start.

Step 302: Connect to a first base station of the wireless communication system.

Step 304: Be assigned a first RNTI by the first base station for communication with the first base station.

Step 306: Receive a radio resource control (RRC) message for configuring communication with a second base station of the wireless communication from the first base station, wherein the RRC message includes a second RNTI and the second RNTI is assigned by the second base station.

Step 308: Perform communication with the first base station with the first RNTI and perform communication with the second base station with the second RNTI.

Step 310: End.

According to the process 30, the communication device connects to the first base station and uses a first RNTI to communicate with the first base station. The first base station may add the second base station in the communication device configuration for communication, e.g., data or signaling transmission/reception to/from the communication device via the second base station, so as to enable dual connectivity. As a result, the first base station sends a RRC message (e.g. RRCConnectionReconfiguration) to configure the communication device to communicate with the second base station, wherein the RRC message contains the second RNTI assigned by the second base station. Note that, the second base station can generate the RRC message including the second RNTI by itself and transmit the RRC message to the first base station (so that the first station forwards the RRC message to the communication device); or, the second base station can transmit the second RNTI to the first base station and let the first base station do the generation of the RRC message. The communication device performs communication with the first base station with the first RNTI and performs communication with the second base station with the second RNTI. Therefore, no RNTI collision will occur in dual connectivity. Note that, the first and second RNTIs may be C-RNTIs or Semi-Persistent Scheduling (SPS) C-RNTIs used for data communication (i.e. data transmission and/or data reception) with the first base station and second base station respectively. The first and second RNTIs may be Transmit Power Control (TPC) RNTIs used for signaling communication (i.e. transmission/reception of TPC commands indicating increasing or decreasing uplink transmission power) with the first base station and second base station respectively.

Take an example based on the process 30. Please refer to FIG. 4, which is a message sequence chart of a first embodiment according to the present invention. First, the UE has a RRC connection to a cell1 of the eNB1 and has a C-RNTI1 with the eNB1. In order to realize dual connectivity (namely the UE can communicate with the eNB1 and eNB2 simultaneously), the eNB1 transmits a cell addition request to the eNB2, to request for adding a cell2 of the eNB2 for the UE (step 400). The eNB2 transmits a cell addition response including a C-RNTI2 assigned by the eNB2 to the eNB1, to respond to the cell addition request (step 402). The eNB1 generates and transmits a RRC message including the C-RNTI2 assigned by the eNB2 to the UE after receiving the cell addition response (step 404). The UE transmits a RRC message response to acknowledge the reception of the RRC message (step 406). Note that, the RRC message contains at least one of physical cell identity and carrier frequency to identify the cell2. The physical cell identity and carrier frequency may be transmitted by the eNB2 to the eNB1 or may be generated by the eNB1.

After the UE obtains the C-RNTI2 with the eNB2, the UE may perform a non-contention based random access procedure to the eNB2 if the non-contention based random access procedure is required by the eNB2 for uplink time alignment. In detail, the UE transmits a random access preamble in random access channel (RACH) resource location to the eNB2, wherein the random access preamble is assigned by the eNB2 and the assignment is contained in the RRC message (step 404) or in a RA preamble assignment message (step 408), e.g. an PDCCH order, sent by the eNB2. The RACH resource location identifies which subframe(s) is used for transmitting the random access preamble and is contained in the preamble assignment message, or in the RRC message, or in system information broadcasted by the eNB2. The UE receives a random access response from the eNB2. If the random access response includes a random access preamble identifier corresponding to the random access preamble, the UE completes the non-contention based random access procedure. The UE applies a timing advance command included in the random access response for uplink time alignment with the eNB2. After completing the non-contention based random access procedure, the UE may simultaneously monitor PDCCH/Enhanced PDCCH (EPDCCH) transmitted from the eNB1 with C-RNTI1 and PDCCH/EPDCCH transmitted from the eNB2 with C-RNTI2 (steps 414-416). If the UE detects PDCCH/EPDCCH with cyclic redundancy check (CRC) scrambled by C-RNTI2 from the eNB2, the UE decodes the PDCCH/EPDCCH with CRC scrambled by C-RNTI2 and uses downlink assignment contained in the PDCCH/EPDCCH for receiving data or uplink grant contained in the PDCCH/EPDCCH for transmitting data. Hence the UE simultaneously uses C-RNTI1 for data or signaling transmission/reception with the eNB1 and C-RNTI2 for data or signaling transmission/reception with the eNB2.

Figure 4:
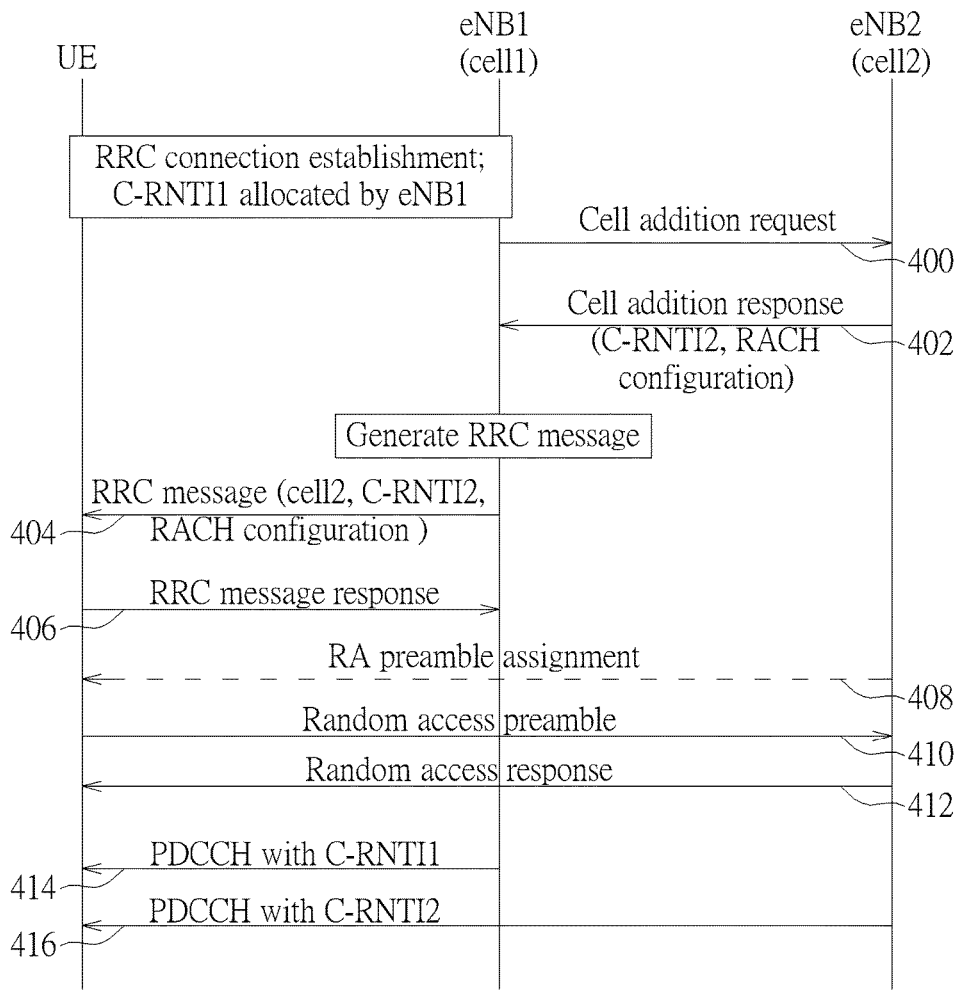
FIGS. 4-6 are schematic diagrams of embodiments according to FIG. 3.
Figure 5:
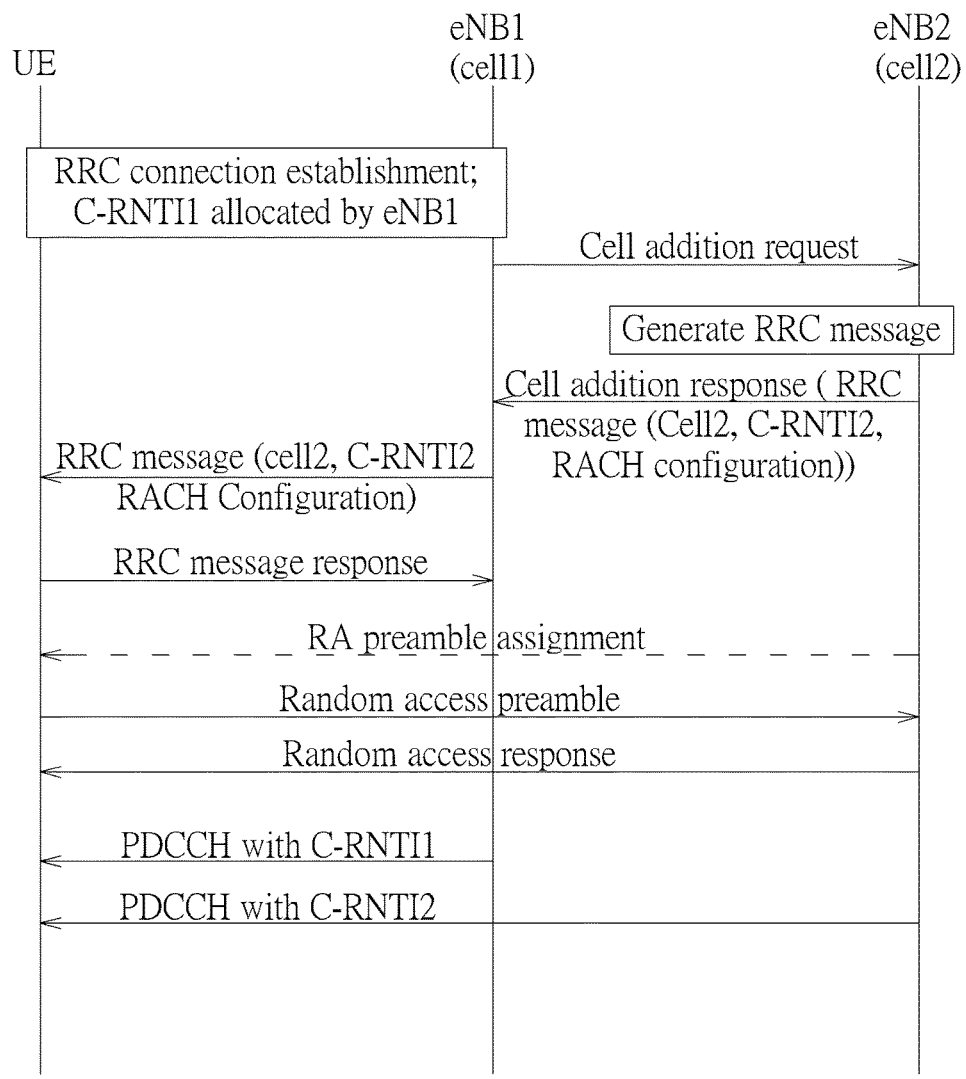

Please refer to FIG. 5, which is a message sequence chart of a second embodiment according to the present invention. The difference to the first embodiment shown in FIG. 4 is that the RRC message including the C-RNTI2 is generated by the eNB2, and is transmitted to the UE via the eNB1.

Figure 6:
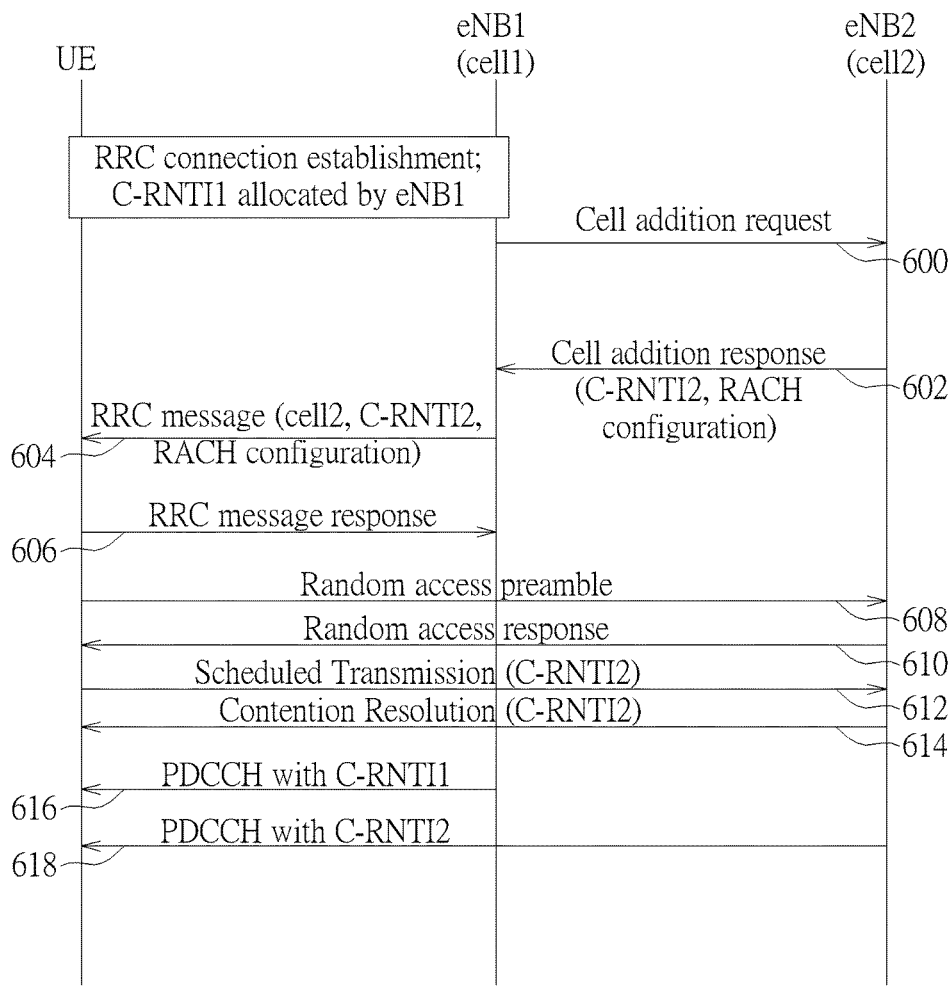

Alternatively, after the UE obtains the C-RNTI2 with the eNB2, the UE may perform a contention based random access procedure to the eNB2 if the contention based random access procedure is required by the eNB2 for uplink time alignment. Please refer to FIG. 6, which is a message sequence chart of a third embodiment according to the present invention. The UE transmits a random access preamble in RACH resource location to the eNB2 (step 608), wherein the random access preamble is selected by the UE from a set of preambles. The set of preambles and the RACH resource location may be configured in the RRC message or in system information broadcasted by the eNB2. The UE receives a random access response from the eNB2 in response to the random access preamble (step 610), wherein the random access response contains an uplink grant and a random access preamble identifier which corresponds to the selected random access preamble. The UE transmits a scheduled transmission (i.e. MAC PDU) containing the C-RNTI2 according to the uplink grant (step 612). In response to the scheduled transmission containing the C-RNTI2, the eNB2 transmits a contention resolution message containing the C-RNTI2 (e.g. PDCCH/EPDCCH with CRC scrambled by C-RNTI2) to the UE. After completing the contention based random access procedure, the UE may simultaneously monitor PDCCH/EPDCCH transmitted from the eNB1 with C-RNTI1 and PDCCH/EPDCCH transmitted from the eNB2 with C-RNTI2 (steps 616-618). If the UE detects PDCCH/EPDCCH with CRC scrambled by C-RNTI2 from the eNB2, the UE decodes the PDCCH/EPDCCH with CRC scrambled by C-RNTI2 and uses downlink assignment contained in the PDCCH/EPDCCH for receiving data or uplink grant contained in the PDCCH/EPDCCH for transmitting data. Hence the UE simultaneously uses C-RNTI1 for data or signaling transmission/reception with the eNB1 and C-RNTI2 for data or signaling transmission/reception with the eNB2.

Note that, if the RRC message further contains a TPC RNTI and uplink time alignment is required for communication with the eNB2, the UE starts to apply a TPC command received from the eNB2 in PDCCH/EPDCCH with CRC scrambled by TPC RNTI after completing a random access procedure which is a non-contention based random access procedure or a contention based random access procedure as described above. If the RRC message further contains the TPC RNTI and the uplink time alignment for communication with eNB2 is not required, the UE starts to apply a TPC command received in PDCCH/EPDCCH with CRC scrambled by TPC RNTI after receiving the RRC message. Similarly if the RRC message further contains a SPS C-RNTI, after completing a random access procedure, the UE may monitor PDCCH/EPDCCH transmitted from the eNB2 with the SPS C-RNTI for activation/deactivation of SPS. In other words, the eNB2 may transmit PDCCH with CRC scrambled with the SPS C-RNTI to activate or deactivate SPS after the random access procedure. If the random access procedure is not required, the UE starts to monitor PDCCH/EPDCCH with CRC scrambled by the SPS RNTI after receiving the RRC message. The RRC message indicates the uplink time alignment for communication with eNB2 is required or not.

Figure 7:
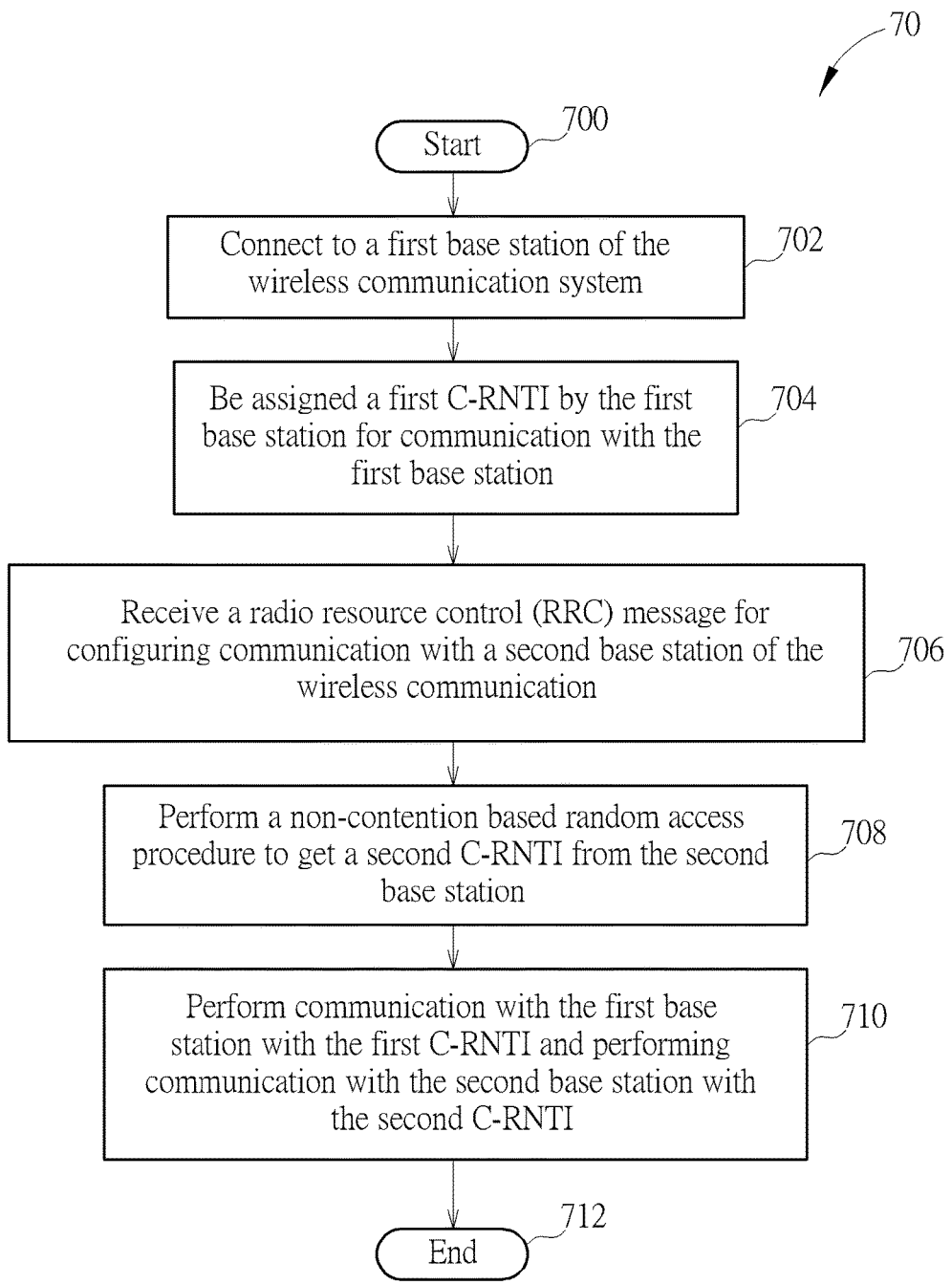
FIG. 7 is a flowchart of a process according to an example of the present invention.

Please refer to FIG. 7, which is a flowchart of a process 70 according to an example of the present invention. The process 70 is utilized in the communication device shown in FIG. 1, for C-RTNI allocation in dual connectivity in the wireless communication system 10. The process 70 may be compiled into the program code 314. The process 70 includes the following steps:

Step 700: Start.

Step 702: Connect to a first base station of the wireless communication system.

Step 704: Be assigned a first C-RNTI by the first base station for communication with the first base station.

Step 706: Receive a radio resource control (RRC) message for configuring communication with a second base station of the wireless communication.

Step 708: Perform a non-contention based random access procedure to get a second C-RNTI from the second base station.

Step 710: Perform communication with the first base station with the first C-RNTI and performing communication with the second base station with the second C-RNTI.

Step 712: End.

According to the process 70, the communication device connects to the first base station and uses a first C-RNTI to communicate with the first base station. The first base station may add the second base station in the communication device configuration for data transmission/reception to/from the communication device via the second base station, so as to enable dual connectivity. As a result, the first base station sends a RRC message (e.g. RRCConnectionReconfiguration) to configure the communication device to communicate with the second base station and the RRC message does not include a second C-RNTI. The UE performs the non-contention based random access procedure to directly get the second C-RNTI in a random access response of the non-contention based random access procedure from the second base station, so as to avoid C-RNTI collision in dual connectivity.

Figure 8:
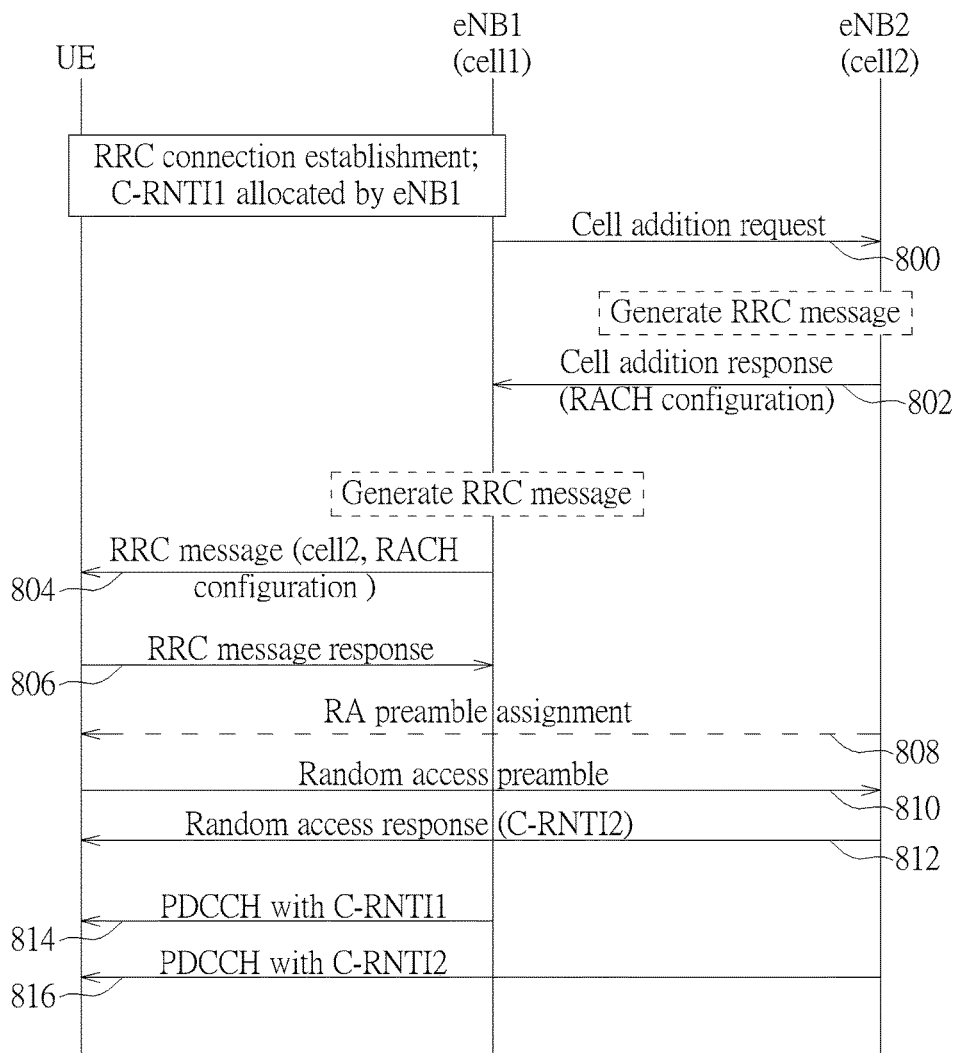
FIG. 8 is a schematic diagram of an embodiment according to FIG. 7.

In detail, please refer to FIG. 8, which is a message sequence chart of a fourth embodiment according to the present invention. First, the UE has a RRC connection to a cell1 of the eNB1 and has a C-RNTI1 with the eNB1. In order to realize dual connectivity, the eNB1 transmits a cell addition request to the eNB2, to request for adding a cell2 of the eNB2 for the UE (step 800). The eNB2 transmits a cell addition response including RACH configuration for random access procedure for the UE to the eNB1, to respond to the cell addition request (step 802). The eNB1 or the eNB2 generates and transmits a RRC message (e.g. RRCConnectionReconfiguration) for configuring the cell2 of the eNB2 to the UE after receiving the cell addition response (step 804). Note that, the RRC message contains at least one of physical cell identity and carrier frequency to identify the cell2. The physical cell identity and carrier frequency may be transmitted by the eNB2 to the eNB1 or may be generated by the eNB1. The UE transmits a RRC message response to acknowledge the reception of the RRC message (step 806). In addition, the UE performs a non-contention based random access procedure. The UE transmits a random access preamble in RACH resource location to the eNB2, wherein the random access preamble is assigned by the second eNB and contained in the RRC message or in a RA preamble assignment message (e.g. PDCCH order) sent by the eNB2 (steps 808-810). The UE receives a random access response containing a C-RNTI2 from the eNB2 (step 812). After that, the UE may simultaneously monitor PDCCH/EDPCCH transmitted from the eNB1 with C-RNTI1 and PDCCH/EPDCCH transmitted from the eNB2 with C-RNTI2 (steps 814-816).

Figure 9:
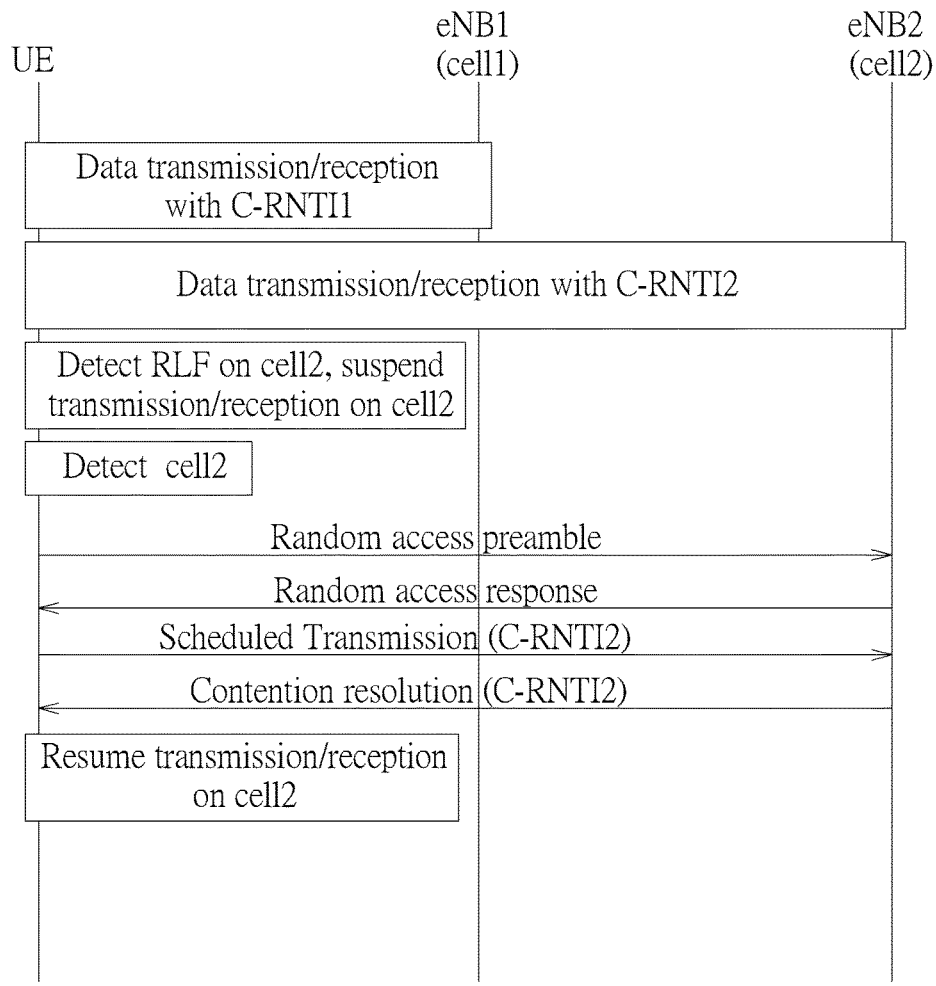
FIGS. 9-11 are schematic diagrams of embodiments according to the present invention.

On the other hand, please refer to FIG. 9, which is a message sequence chart of a fifth embodiment according to the present invention. After the UE obtains the C-RNTI1 and C-RNTI2 for the eNB1 and eNB2 based on the abovementioned processes 30 and 70, the UE has data transmission/reception with the cell1 of eNB1 by using the C-RNTI1 and data transmission/reception with the cell2 of eNB2 by using a C-RNTI2. However, the UE may detect radio link failure (RLF) on the cell2 and suspends or stops transmission and reception on the cell2. The UE may detect the cell2 again and transmits a random access preamble to the cell2. As a result, the eNB2 transmits the random access response in response to the random access preamble. The UE transmits a scheduled transmission containing the C-RNTI2 according to an uplink grant contained in the received random access response. The UE receives a contention resolution message containing the C-RNTI2 after transmitting the scheduled transmission. After the UE completes the random access procedure, the UE considers the radio link with the cell2 is recovered and resumes transmission and reception on the cell2.

Note that, if the RRC message further contains a TPC RNTI, the UE starts to apply a TPC command received from the eNB2 in PDCCH/EPDCCH with CRC scrambled by TPC RNTI after completing a random access procedure which is a non-contention based random access procedure or a contention based random access procedure as described above. Similarly if the RRC message further contains a SPS C-RNTI, after completing a random access procedure, the UE may monitor PDCCH/EPDCCH transmitted from the eNB2 with the SPS C-RNTI for activation/deactivation of SPS. In other words, the eNB2 may transmit PDCCH with CRC scrambled with the SPS C-RNTI to activate or deactivate SPS after the random access procedure. The RRC message indicates the uplink time alignment for communication with eNB2 is required or not.

In another embodiment, after the UE detects the RLF, the UE starts a timer; after the timer expires, the UE releases a configuration of the cell2 of the eNB2 (e.g. the C-RNTI2). On the other hand, the UE stops the timer when the UE considers the radio link is recovered or receives a RRC message from the eNB1, wherein the RRC message indicates the UE to release the configuration of the cell2 of the eNB2. In addition, the RRC message may contain at least one of (physical) cell identity and carrier frequency to identify the cell2 of the eNB2. Alternatively the RRC message may contain an index to identify the cell2. The index corresponds to the cell2 and was assigned in a RRC message configuring communication with the cell2.

Figure 10:
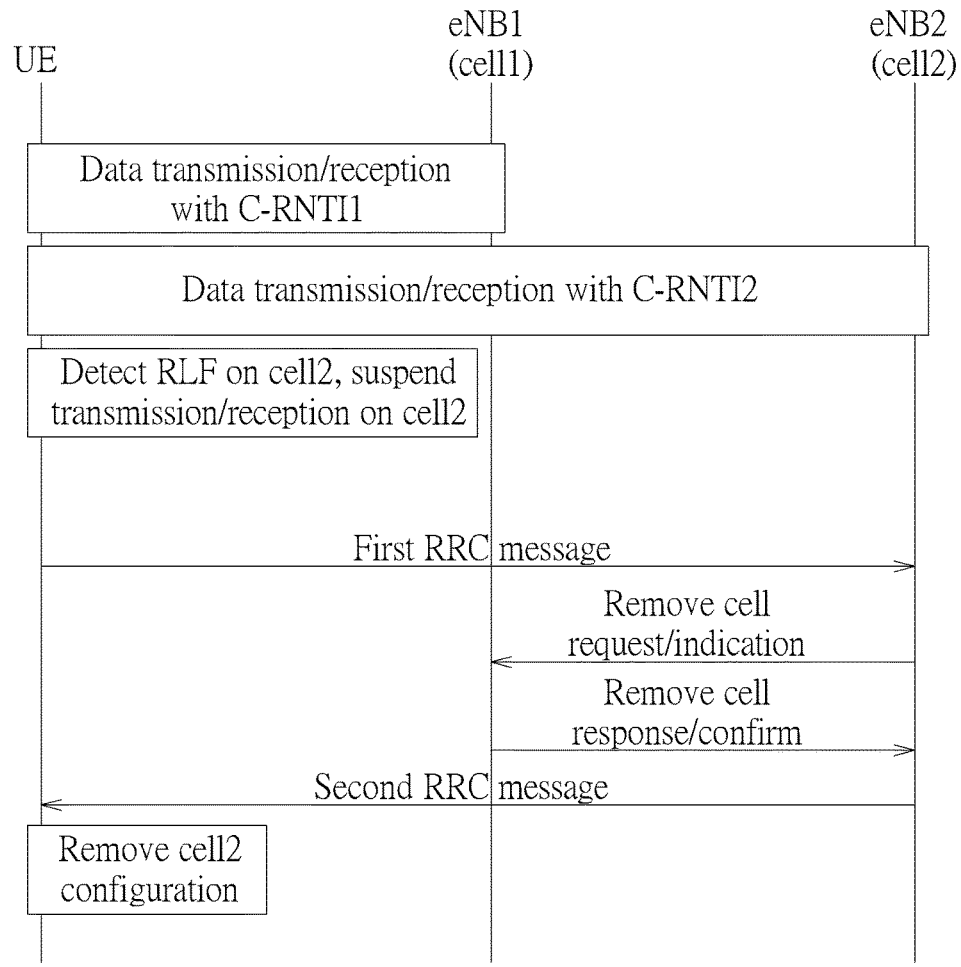

In another embodiment, as shown in FIG. 10, after the UE detects the RLF, the UE transmits a first RRC message indicating the RLF to the eNB2 via the eNB1. After the eNB2 receives the first RRC message, the eNB2 sends a remove cell request or a remove cell indication to the eNB1. The eNB1 or the eNB2 transmits a second RRC message in response to the first RRC message to indicate the UE to release the configuration of the cell2 of the eNB2.

Figure 11:
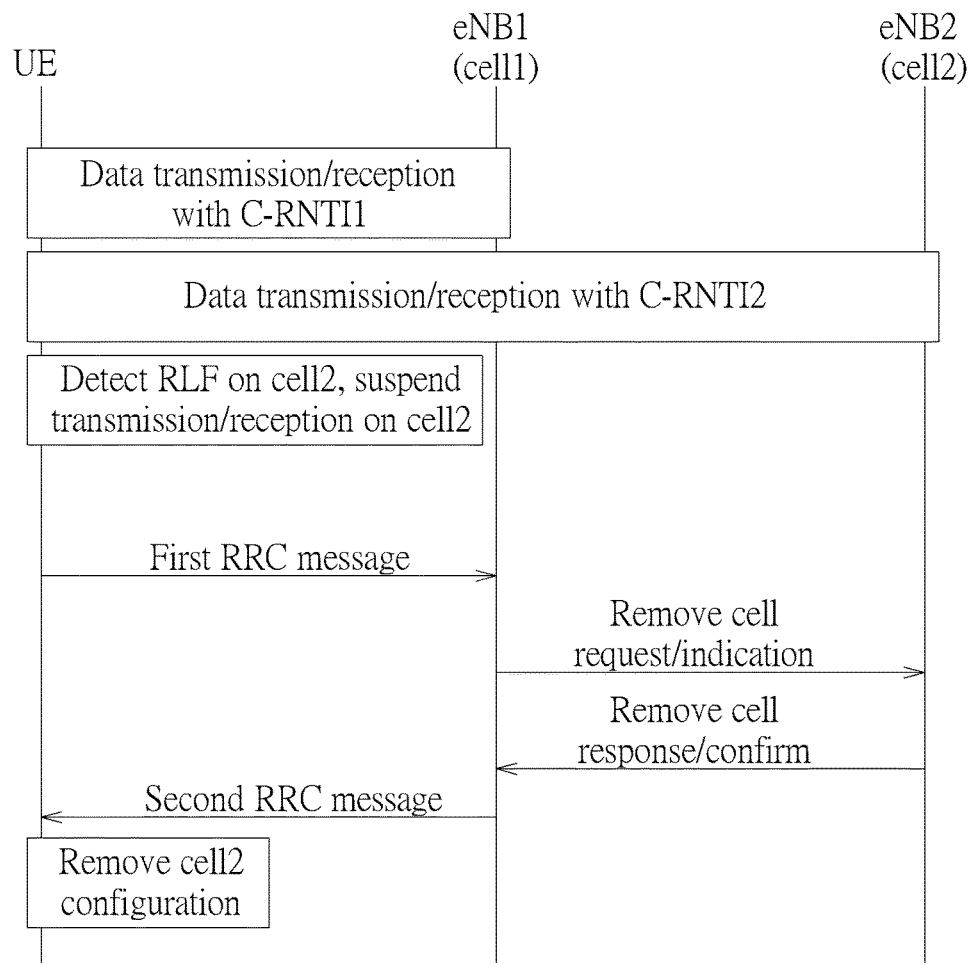

In another embodiment, as shown in FIG. 11, after the UE detects the RLF, the UE transmits a first RRC message to the eNB1. The eNB 1 then sends a remove cell request or a remove cell indication to the eNB2. The eNB1 or the eNB2 (via the eNB1) transmits a second RRC message in response to the first RRC message to indicate the UE to release the configuration of the cell2 of the eNB2.

Figure 12:
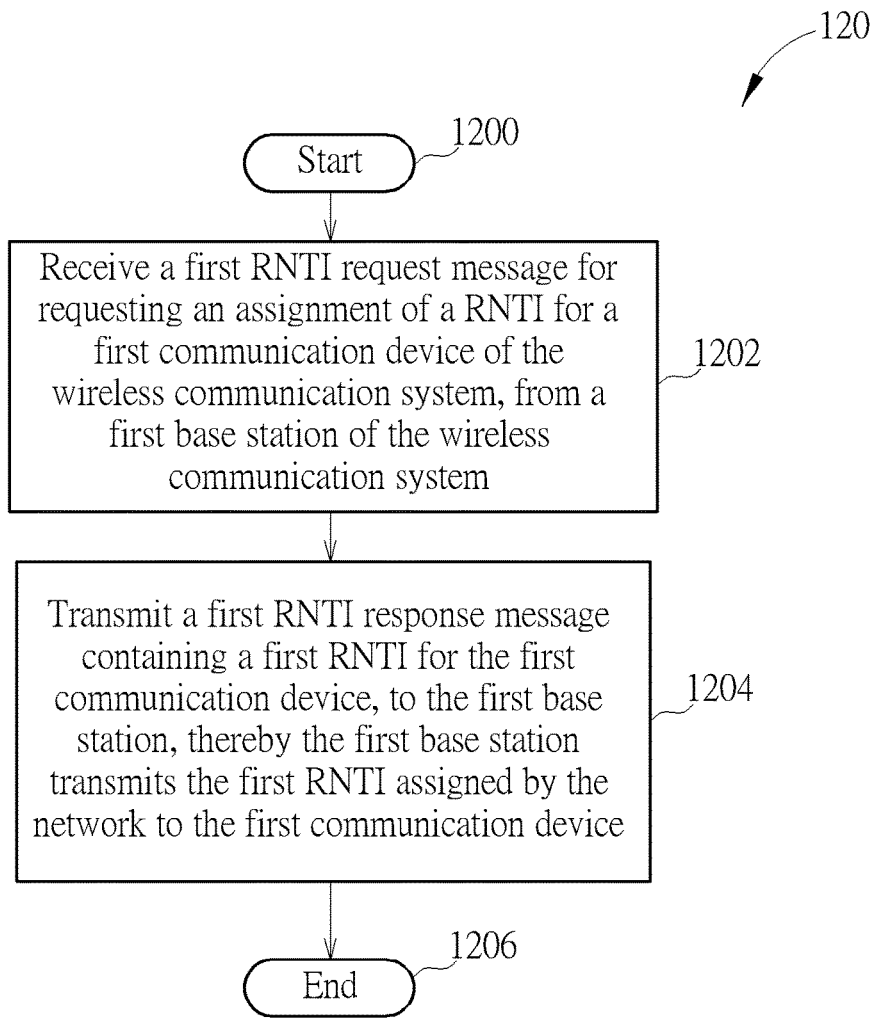
FIG. 12 is a flowchart of a process according to an example of the present invention.

Please refer to FIG. 12, which is a flowchart of a process 120 according to an example of the present invention. The process 120 is utilized in the network shown in FIG. 1, for RTNI allocation in dual connectivity in the wireless communication system 10. The process 120 may be compiled into the program code 314. The process 120 includes the following steps:

Step 1200: Start.

Step 1202: Receive a first RNTI request message for requesting an assignment of a RNTI for a first communication device of the wireless communication system, from a first base station of the wireless communication system.

Step 1204: Transmit a first RNTI response message containing a first RNTI for the first communication device, to the first base station, thereby the first base station transmits the first RNTI assigned by the network to the first communication device.

Step 1206: End.

According to the process 120, a network node is responsible for RNTI allocation request by other base stations. In an example, when an eNB1 needs to allocate a RNTI to a UE1, the eNB1 sends a RNTI request to the network node and the network node responds with a RNTI response containing a first RNTI. Then, the eNB1 transmits the first RNTI to the UE1. In addition, when an eNB2 needs to allocate a RNTI to a UE2, the eNB2 also sends a RNTI request to the network node and the network node responds with a RNTI response containing the second RNTI. The eNB2 transmits the second RNTI to the UE2, wherein the first RNTI and the second RNTI shall be different. Note that, the first and second RNTIs may be C-RNTIs or Semi-Persistent Scheduling (SPS) C-RNTIs used for data communication (i.e. data transmission and/or data reception) with the eNB1 and eNB2 respectively. The first and second RNTIs may be Transmit Power Control (TPC) RNTIs used for signaling communication (i.e. transmission/reception of TPC commands indicating increasing or decreasing uplink transmission power) with the eNB1 and eNB2 respectively.

According to the above, when a UE communicating with the eNB1 using a first RNTI assigned by the eNB1 is configured to further communicate with the eNB2, the eNB2 does not need to assign a second RNTI for a UE. In other words, the UE1 is configured with a single RNTI for both communication with the eNB1 and communication with the eNB2 because no UEs use a same RNTI to communicate with a same eNB. Since the RNTI allocation is centralized for the eNB1 and eNB2, the RNTI collision in two UEs is resolved. The network node does not allocate the same RNTI to two UEs if the two UEs perform data transmission/reception in a same eNB.

In conclusion, the UE obtains a RNTI of a newly added eNB with a RRC message for configuring the newly added eNB to the UE, from a connected eNB, or with a random access response of a non-contention based random access procedure, so as to avoid RNTI collision in dual connectivity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device in a wireless communication system for radio network temporary identifier (RNTI) allocation in dual connectivity, the communication device comprising:

a processing circuit, for executing a program; and a storage unit, coupled to the processing circuit, for storing the program which instructs the processing circuit to perform the following steps:

connecting to a first base station of the wireless communication system;
receiving a first RNTI assigned by the first base station for communication with the first base station;
receiving a radio resource control (RRC) message including a second RNTI for configuring communication with a second base station of the wireless communication from the first base station, wherein the second RNTI is assigned by the second base station;
transmitting a RRC message response to the first base station in response to the RRC message;
performing communication with the first base station with the first RNTI and performing communication with the second base station with the second RNTI, in dual connectivity;
transmitting a random access preamble in a random access channel (RACH) resource location to the second base station, wherein the random access preamble is selected by the communication device from a set of preambles broadcasted by the second base station in system information or configured in the RRC message, and the RACH resource location is configured in the RRC message or broadcasted by the second base station in the system information;
receiving a random access response from the second base station in response to the random access preamble, wherein the random access response contains a random access preamble identifier corresponding to the random access preamble, a timing advance command and an uplink grant;
applying the timing advance command for uplink time alignment with the second base station;
transmitting a scheduled transmission containing the second RNTI to the second base station according to the uplink grant; and
receiving a contention resolution message containing the second RNTI from the second base station.

2. The communication device of claim 1, wherein the RRC message is generated by the first base station or the RRC message is generated by the second base station and transmitted from the second base station to the first station.

3. The communication device of claim 1, further comprising:
transmitting a random access preamble in a random access channel (RACH) resource location to the second base station, wherein the random access preamble is assigned by the second base station and contained in the RRC message or in a random access preamble assignment message transmitted by the second base station, and the RACH resource location is configured in the RRC message or broadcasted by the second base station in the system information;
receiving a random access response from the second base station in response to the random access preamble, wherein the random access response contains a random access preamble identifier corresponding to the random access preamble, a timing advance command and an uplink grant; and
applying the timing advance command for uplink time alignment with the second base station.

4. The communication device of claim 1, further comprising:
transmitting a second random access preamble to the second base station after a radio link failure is detected in communication with the second base station;
receiving a second random access response including an uplink grant in response to the second random access preamble, from the second base station;
transmitting a second scheduled transmission containing the second RNTI to the second base station according to the uplink grant;
receiving a second contention resolution message containing the second RNTI from the second base station; and
considering the radio link with the second base station is recovered.

5. The communication device of claim 4, wherein the program further instructs the following steps:
starting a timer when detecting the radio link failure in communication with the second base station; and
stopping the timer when the communication device considers the radio link is recovered or when the communication device receives a second RRC message indicating the communication device to release a configuration associated to the second base station and stored in the communication device, from the first base station; and
releasing the configuration when the timer expires.

6. The communication device of claim 5, wherein the second RRC message contains at least one of an identity and carrier frequency to identify the second base station.

7. The communication device of claim 1, wherein the program further instructs the following steps:
transmitting a third RRC message indicating a radio link failure to the second base station via the first base station, after the radio link failure is detected in communication with the second base station; and
receiving a fourth RRC message in response to the third RRC message to indicate the communication device to release a configuration associated to the second base station, from the first base station.

8. The communication device of claim 1, wherein the program further instructs the following steps:
transmitting a fifth RRC message indicating a radio link failure to the first base station, after the radio link failure is detected in communication with the second base station, thereby the first base station transmits a cell remove request message to the second base station when receiving the fifth RRC message; and
receiving a sixth RRC message in response to the fifth RRC message to indicate the communication device to release a configuration associated to the second base station, from the first base station.

9. A network in a wireless communication system for radio network temporary identifier (RNTI) allocation in dual connectivity, comprising:
a first base station, which includes a processing circuit, for executing a program, and a storage unit, coupled to the processing circuit, for storing the program which instructs the processing circuit to perform the following steps:
connecting to a communication device of the wireless communication system;
assigning a first RNTI to the communication device for communication with the communication device;
transmitting a radio resource control (RRC) message for configuring the communication device to communicate with a second base station of the wireless communication to the communication device, wherein the RRC message includes a second RNTI, and the second RNTI is assigned by the second base station and transmitted by the second base station to the first base station;

receiving a RRC message response from the communication device, wherein the communication device transmits the RRC message response in response to the RRC message; and a second base station, which includes a processing circuit, for executing a program, and a storage unit, coupled to the processing circuit, for storing the program which instructs the processing circuit to perform the following steps:

receiving a random access preamble from the communication device;

transmitting a random access response to the communication device in response to the random access preamble, wherein the random access response contains a random access preamble identifier corresponding to the random access preamble, a timing advance command and an uplink grant;

receiving a scheduled transmission containing the second RNTI, which is transmitted by the communication device according to the uplink grant; and transmitting a contention resolution message containing the second RNTI to the communication device.

10. The network of claim 9, wherein the program further instructs the following steps:

transmitting a third RRC message indicating a radio link failure to the second base station via the first base station, after the radio link failure is detected in communication with the second base station; and receiving a fourth RRC message in response to the third RRC message to indicate the communication device to release a configuration associated to the second base station, from the first base station.

11. The network of claim 9, wherein the program further instructs the following steps:

transmitting a fifth RRC message indicating a radio link failure to the first base station, after the radio link failure is detected in communication with the second base station, thereby the first base station transmits a cell remove request message to the second base station when receiving the fifth RRC message; and receiving a sixth RRC message in response to the fifth RRC message to indicate the communication device to release a configuration associated to the second base station, from the first base station.

12. A communication device in a wireless communication system for radio network temporary identifier (RNTI) allocation in dual connectivity, the communication device comprising:

a processing circuit, for executing a program; and a storage unit, coupled to the processing circuit, for storing the program which instructs the processing circuit to perform the following steps:

connecting to a first base station of the wireless communication system;

receiving a first RNTI assigned by the first base station for communication with the first base station;

receiving a radio resource control (RRC) message including a second RNTI for configuring communication with a second base station of the wireless communication from the first base station, wherein the second RNTI is assigned by the second base station;

transmitting a RRC message response to the first base station in response to the RRC message;

performing communication with the first base station with the first RNTI and performing communication with the second base station with the second RNTI, in dual connectivity;

transmitting a fifth RRC message indicating a radio link failure to the first base station, after the radio link failure is detected in communication with the second base station, thereby the first base station transmits a cell remove request message to the second base station when receiving the fifth RRC message; and receiving a sixth RRC message in response to the fifth RRC message to indicate the communication device to release a configuration associated to the second base station, from the first base station.

13. A first base station in a wireless communication system for radio network temporary identifier (RNTI) allocation in dual connectivity, the first base station comprising:

a processing circuit, for executing a program; and a storage unit, coupled to the processing circuit, for storing the program which instructs the processing circuit to perform the following steps:

connecting to a communication device of the wireless communication system;

assigning a first RNTI to the communication device for communication with the communication device;

transmitting a radio resource control (RRC) message for configuring the communication device to communicate with a second base station of the wireless communication system to the communication device, wherein the RRC message includes a second RNTI, and the second RNTI is assigned by the second base station and transmitted by the second base station to the first base station;

receiving a RRC message response from the communication device, wherein the communication device transmits the RRC message response in response to the RRC message;

receiving a fifth RRC message indicating a radio link failure from the communication device, after the radio link failure is detected in communication with the second base station by the communication device;

transmitting a cell remove request message to the second base station when receiving the fifth RRC message; and transmitting a sixth RRC message which indicates the communication device to release a configuration associated to the second base station.

14. A communication device in a wireless communication system for radio network temporary identifier (RNTI) allocation in dual connectivity, the mobile device comprising:

a processing circuit, for executing a program; and a storage unit, coupled to the processing circuit, for storing the program which instructs the processing circuit to perform the following steps:

connecting to a first base station of the wireless communication system;

receiving a first RNTI assigned by the first base station for communication with the first base station;

receiving a radio resource control (RRC) message including a second RNTI for configuring communication with a second base station of the wireless communication from the first base station, wherein the second RNTI is assigned by the second base station;

transmitting a RRC message response to the first base station in response to the RRC message;

performing communication with the first base station with the first RNTI and performing communication with the second base station with the second RNTI, in dual connectivity;

transmitting a random access preamble in a random access channel (RACH) resource location to the second base station, wherein the random access preamble is assigned by the second base station and contained in the RRC message or in a random access preamble assignment message transmitted by the second base station, and the RACH resource location is configured in the RRC message or broadcasted by the second base station in the system information;

receiving a random access response from the second base station in response to the random access preamble, wherein the random access response contains a random access preamble identifier corresponding to the random access preamble, a timing advance command and an uplink grant; and applying the timing advance command for uplink time alignment with the second base station.

15. The communication device of claim 14, wherein the program further instructs the following steps:

transmitting a third RRC message indicating a radio link failure to the second base station via the first base station, after the radio link failure is detected in communication with the second base station; and receiving a fourth RRC message in response to the third RRC message to indicate the communication device to release a configuration associated to the second base station, from the first base station.

16. The communication device of claim 14, wherein the program further instructs the following steps:

transmitting a fifth RRC message indicating a radio link failure to the first base station, after the radio link failure is detected in communication with the second base station, thereby the first base station transmits a cell remove request message to the second base station when receiving the fifth RRC message; and receiving a sixth RRC message in response to the fifth RRC message to indicate the communication device to release a configuration associated to the second base station, from the first base station.

17. A network in a wireless communication system for radio network temporary identifier (RNTI) allocation in dual connectivity, the network comprising:

a first base station, which includes a processing circuit, for executing a program, and a storage unit, coupled to the processing circuit, for storing the program which instructs the processing-circuit to perform the following steps:

connecting to a communication device of the wireless communication system;

assigning a first RNTI to the communication device for communication with the communication device;

transmitting a radio resource control (RRC) message for configuring the communication device to communicate with a second base station of the wireless communication system to the communication device, wherein the RRC message includes a second RNTI, and the second RNTI is assigned by the second base station and transmitted by the second base station to the first base station;

receiving a RRC message response from the communication device, wherein the communication device transmits the RRC message response in response to the RRC message;

performing communication with the communication device with the first RNTI; and a second base station, which includes a processing circuit, for executing a program, and a storage unit, coupled to the processing circuit, for storing the program which instructs the processing circuit to perform the following steps:

performing communication with the communication device with the second RNTI;

receiving a random access preamble in a random access channel (RACH) resource location from the communication device, wherein the random access preamble is assigned by the second base station and contained in the RRC message or in a random access preamble assignment message transmitted by the second base station, and the RACH resource location is configured in the RRC message or broadcasted by the second base station in the system information; and transmitting a random access response to the communication device in response to the random access preamble, wherein the random access response contains a random access preamble identifier corresponding to the random access preamble, a timing advance command and an uplink grant.

18. The communication device of claim 17, wherein the program stored in the first base station further instructs the following steps:

receiving a fifth RRC message indicating a radio link failure from the communication device, after the radio link failure is detected in communication with the second base station by the communication device;

transmitting a cell remove request message to the second base station when receiving the fifth RRC message; and transmitting a sixth RRC message which indicates the communication device to release a configuration associated to the second base station.

* * * * *